H. A. BEYER.
BOTTLE CAPPING MACHINE.
APPLICATION FILED JAN. 15, 1916.

1,249,003.

Patented Dec. 4, 1917.
7 SHEETS—SHEET 4.

Henry A. Beyer, Inventor
By his Attorney
Charles H. Wilson

H. A. BEYER.
BOTTLE CAPPING MACHINE.
APPLICATION FILED JAN. 15, 1916.

1,249,003.

Patented Dec. 4, 1917.
7 SHEETS—SHEET 7.

Inventor
Henry A. Beyer
By his Attorney
Charles H. Wilson

UNITED STATES PATENT OFFICE.

HENRY A. BEYER, OF CORONA, NEW YORK, ASSIGNOR TO PARAGON METAL CAP CO., OF BROOKLYN, NEW YORK, A CORPORATION OF NEW YORK.

BOTTLE-CAPPING MACHINE.

1,249,003.    Specification of Letters Patent.    Patented Dec. 4, 1917.

Application filed January 15, 1916. Serial No. 72,189.

*To all whom it may concern:*

Be it known that I, HENRY A. BEYER, residing at Corona, Long Island, in the county of Queens and State of New York, have invented certain new and useful Improvements in Bottle-Capping Machines, of which the following is a specification.

This invention relates to a bottle capping machine, and the object of the invention is to provide a simple, efficient and uniformly reliable mechanism for this purpose.

A more specific object is to provide mechanism for applying caps or closures which have threaded connection with the receptacle, and to provide efficient means capable of gripping the cap for rotating the same upon the receptacle without likelihood of injury to the lacquer, paint, or other ornamental characteristic or feature of the closure.

A further object is to embody in the machine a simple and efficient means for operating upon the cap, after the cap has been screwed home, for positively retaining the cap against accidental rotation in a reverse direction.

A further object is to embody in the machine means whereby the machine will be adapted to operate upon bottles or other receptacles of varying proportions.

A further object is to embody in the machine means for operating directly upon the upper end or sealing portion of the cap to change the shape thereof so as to produce a tighter seal than was produced by the screwing home of the cap.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawings which are to be taken as a part of this specification, and in which I have shown a merely preferred form of embodiment of the invention:

Fig. 3 represents a top plan view of the structure shown in Fig. 1.

Fig. 4 represents a fragmentary sectional view taken upon the plane of line IV—IV of Fig. 1, looking in the direction of the arrows.

Fig. 7 represents a horizontal sectional view taken upon the plane of line VII—VII of Fig. 5, looking in the direction of the arrows.

Fig. 8 represents a fragmentary detail view.

Referring to the structure which is shown in the drawings for a detailed description thereof, the reference character L indicates a main standard or frame having a platform 1 formed thereon to support a motor G. A vertically arranged shaft H is rotatably and slidably supported in suitable bearing arms 2 formed upon the face of the standard and a worm gear 3 is splined to said shaft so as to permit relative sliding movement but not relative rotary movement between the gear and shaft. A worm pinion 4 is fixed upon the shaft 5 of the motor G and stands in constant mesh with the gear 3.

In operation the gear 3 is constantly driven, thereby constantly rotating the shaft 8.

A pair of collars 6 are formed upon the shaft and the forked end 7 of a bell crank lever 8 engages between said collars for sliding the shaft upwardly and downwardly.

The bell crank 8 is pivotally mounted as at 9 upon the frame L and its opposite end carries an anti-friction roller 10 which is disposed in operative connection with a cam groove 11 formed in the face of a cam 12.

The cam 12 is mounted loosely upon a stub shaft 13 rotatably supported in the main frame L. A gear 14 is fixed to said stub shaft and is connected through a train of gears 15, 16 and 17 with the shaft of the motor G, whereby the shaft 13 is constantly driven.

A friction disk 18 is mounted upon the shaft 13, having a tongue 19 engaging a slot 20 formed longitudinally of said shaft. A friction washer 21 is arranged between the face of the friction disk 19 and the rear face of the cam 12, and a spring 22 is arranged to compress the friction washer and thereby provide a frictional drive between the constantly rotating shaft 13 and the cam 12.

The outer end of the shaft 13 is threaded and is provided with adjusting nuts 23 for altering the tension of the spring 22.

In order to manually control the rotation of the cam 12, said cam is provided with a notch 24 in its periphery, and a latch rod 25 is arranged to engage in said notch. A spring 26 is provided for urging the latch against the periphery of the cam, and a foot lever 27, having a pull rod 28, is arranged to draw back the latch at the operator's will. The upper end of the pull rod may be connected directly with the latch or it may be connected through the medium of a lever 29 as shown in Fig. 4.

So long as the latch is in engagement with the notch 24 the cam 12 is held against rotation and the shaft H is accordingly also held against sliding movement. As soon, however, as the foot lever 27 is pressed, the cam begins to rotate and the shaft moves vertically in response to the shape or contour of the cam groove 11, as will be pointed out in detail later.

The gripping head comprises in part an inverted cup-shaped shell 30 which has a bearing 31 fitted to receive the lower end of the shaft H, for rotatably and slidably mounting the shell thereon.

In order to slide this gripping head along the shaft, and to control the same during the sliding movement of the shaft, a bell crank lever 32 is provided, which has a bifurcated end straddling the gripping head and engaging oppositely disposed trunnions 33 thereon. The ends of the bifurcations have slots 34 for permitting free swinging movement of the lever, while the engagement of the lever 32 with the said trunnions prevents rotation of the shell 30. The lever is pivotally mounted upon the main frame, as at 35, and its opposite end is provided with an anti-friction roller 36 fitted to enter a cam groove 37 formed in the outer face of a cam 38. The cam 38 is fixed to the cam 12 to rotate therewith and is disposed intermediate the outer face of the cam 12 and the inner end of spring 22. In order to complete the structure at this point a friction disk 39 is arranged at the inner end of the spring, and a friction washer 40 is interposed between said friction disk 39 and the outer face of the cam 38. The friction disk 39 is provided with a finger 41 which extends into the groove 20 of the shaft 13. The two cams 12 and 38 are thus held between opposing friction washers 21 and 40. The two cams may be connected together in any suitable manner, as by the pins 42, and such connection places the cam 38 under control of the foot lever 27 in the same manner as described for cam 12.

The movements of the crank arm are controlled by the contour of the cam groove 37, as will be presently described in detail.

The lower end of the shaft H projects entirely through the bearing 31 and into the interior of the shell 30 of the gripping head, where it serves to support a jaw carrying member 43. The jaw carrying member is frictionally connected with the end of the shaft by being formed with a pocket 44 in its upper face arranged to receive the flanged lower end 45 of the shaft. A friction washer 46 encircles the shaft above the flange 45 and a clamp nut 47 also encircles the shaft and engages the upper face of the friction washer. The annular walls of the pocket are threaded for receiving the nut 47 whereby the nut may be rotated to adjust the friction grip upon the flange 45. A suitable locking element 48 may be provided for retaining the nut against accidental loosening. In order to lend greater efficiency and uniformity to the friction grip at this point the lower end of the shaft is hollowed out, as at 49, and a compression spring 50 is arranged therein so as to press downwardly upon the jaw carrying member to urge the nut 47 against the friction washer 46. A ball bearing 51 is arranged for avoiding injury to the upper end of the spring during relative rotation between the jaw carrying member and the shaft.

The jaw carrying member supports two independent sets of jaws 52 and 53. Each of these sets comprises three jaws slidably mounted so as to move toward and away from the longitudinal central axis of the gripping head.

The jaws 52, are received in pockets 54 formed in the member 43, and are pressed outwardly against the inner walls of the shell 30 by compression springs 55. The outer ends of these jaws are formed with projections 56 having cam-shaped upper end surfaces 57 disposed to be engaged by coöperative annular cam surfaces 58 formed on the inner wall of the shell.

The jaws 53 are arranged below the jaws 52, and are received within pockets 59, while springs 60 are provided for urging them outwardly. Since this set of jaws is arranged at the lower end of the member 43 they are made dove-tail in form, as seen in Fig. 8, in order to prevent them from falling out. Their outer ends are formed with inclined cam surfaces 61 arranged to be engaged by coöperative annular cam surfaces 62 formed upon the shell 30.

The inner ends of the two sets of jaws are shaped so as to best perform their respective functions. The first or upper set is intended to grip tightly upon the exterior surface of the upper portion of the bottle cap to rotate the same. The gripping face of this set of jaws may, therefore, be corrugated or roughened, or otherwise fashioned as desired. The inner end of the lower set of jaws is intended to serve as a means for bending in a portion 64 of the cap to cause said portion to engage about a rib or the like formed upon the bottle. The engagement of the bent portion with the rib on the bottle is intended to retain the cap positively in its sealing position. The inner face of this set of jaws, therefore, is formed with a projecting part or parts 63 adapted for engaging and bending the mentioned portion of the cap.

The table illustrated for supporting the receptacle is resiliently and adjustably connected to the frame L. It comprises a disc 65 from which depends a screw shaft 66. The upper end of the shaft is rotatably connected with the disc by an enlarged head 67 which is received within a pocket formed in the upper surface of the disc. A supporting nut 68 is threaded upon the shaft for engaging the under surface of the disc. The shaft 66 is threaded through a supporting frame 69 and the lower end of said shaft is squared, as at 70, to afford means for rotating the shaft when it is desired to adjust the elevation of the table.

A portion of the edge of the table is flattened, as at 71, so as to provide means coöperating with the flat front surface of the frame L to prevent rotation of the table.

The supporting frame 69 rests upon a plurality of springs 72 and is held against displacement by pins 73 upstanding from the frame L. Upon the upper surface of the table 65 is arranged a pair of spring fingers 74 adapted for receiving and retaining the bottle in a given position to be operated upon by the gripping head.

Figure 1:
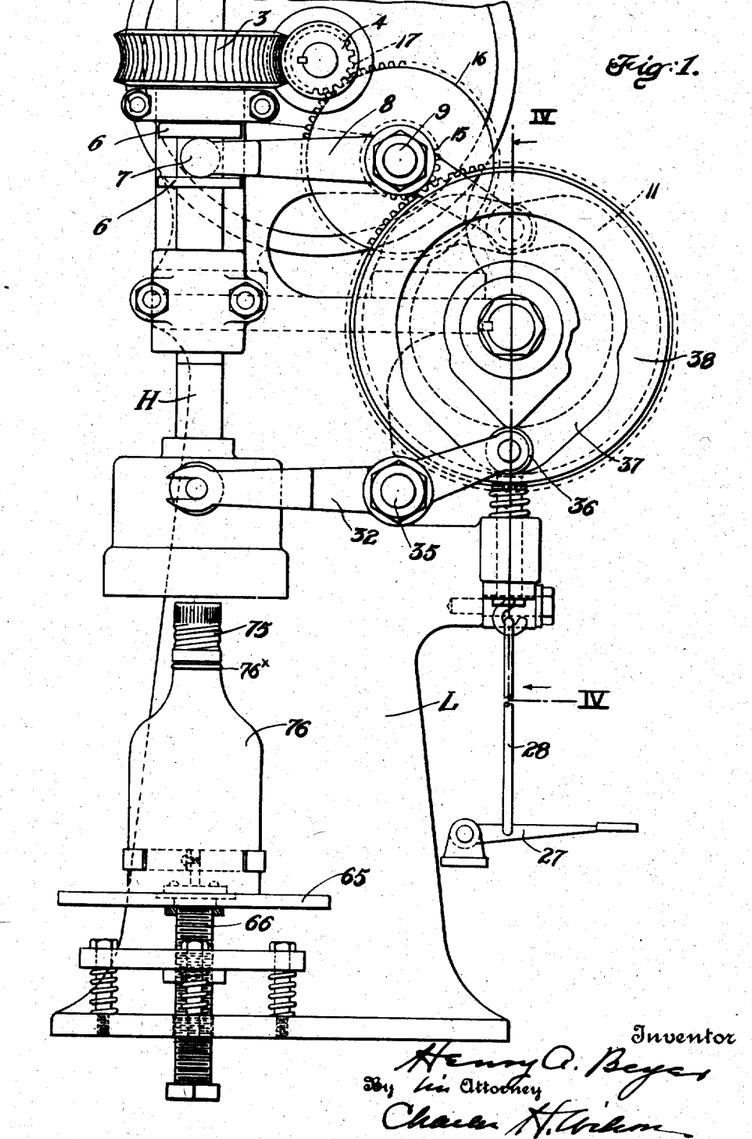
Figure 1 represents a front elevational view of a device constructed in accordance with the provisions of this invention.
Figure 2:
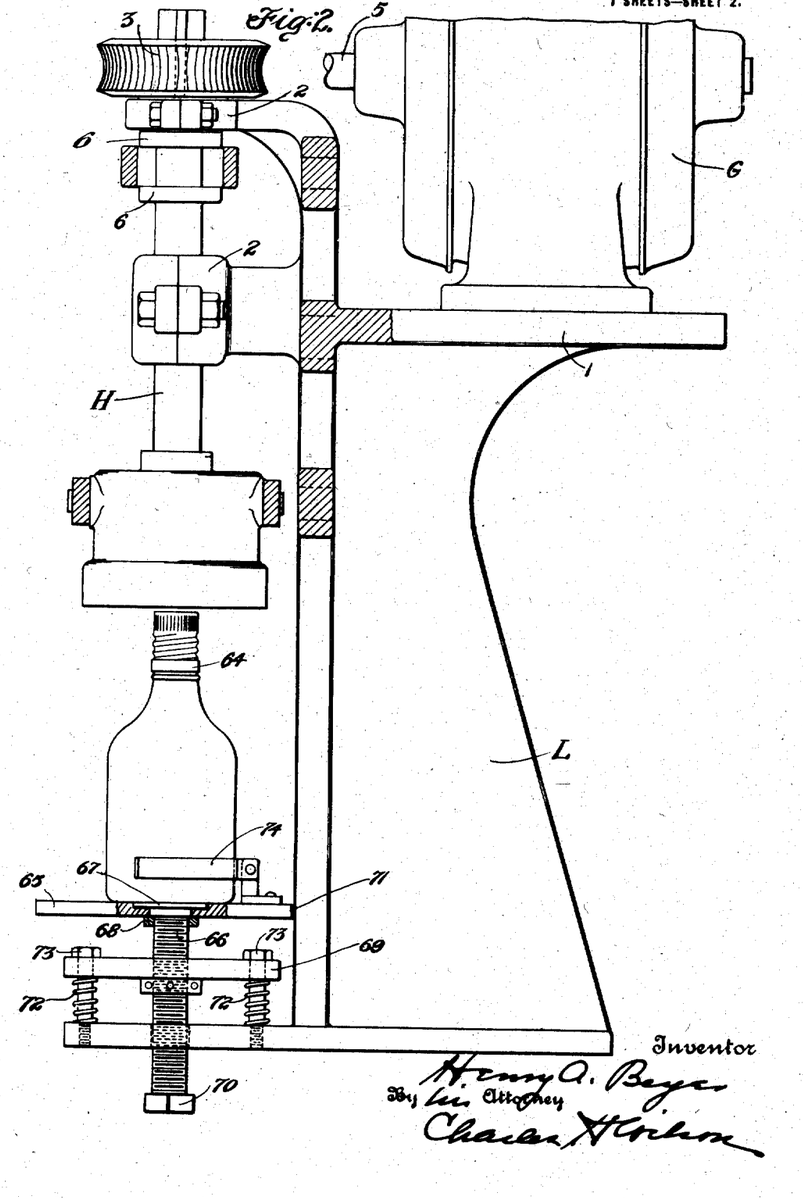
Fig. 2 represents a view similar to Fig. 1, but taken at right angles thereto, parts being shown in vertical section for the sake of clearness.
Figure 5:
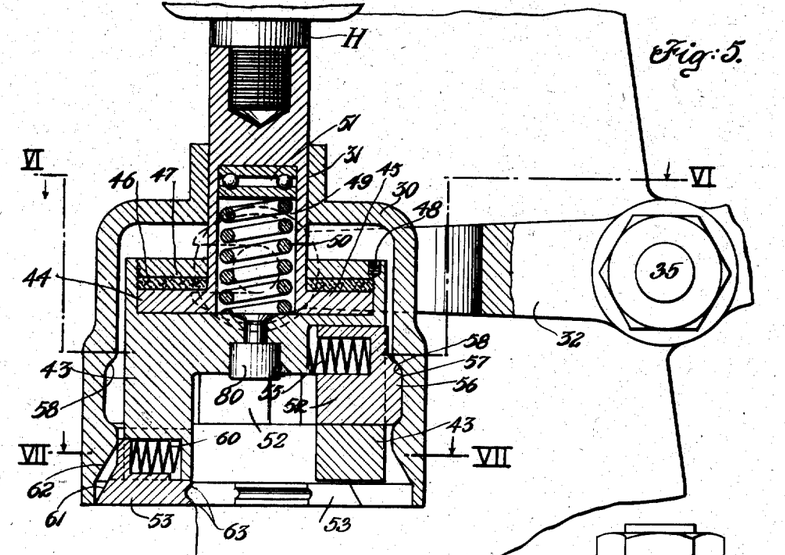
Fig. 5 represents an enlarged fragmentary sectional view through the gripping head and associated parts.
Figure 6:
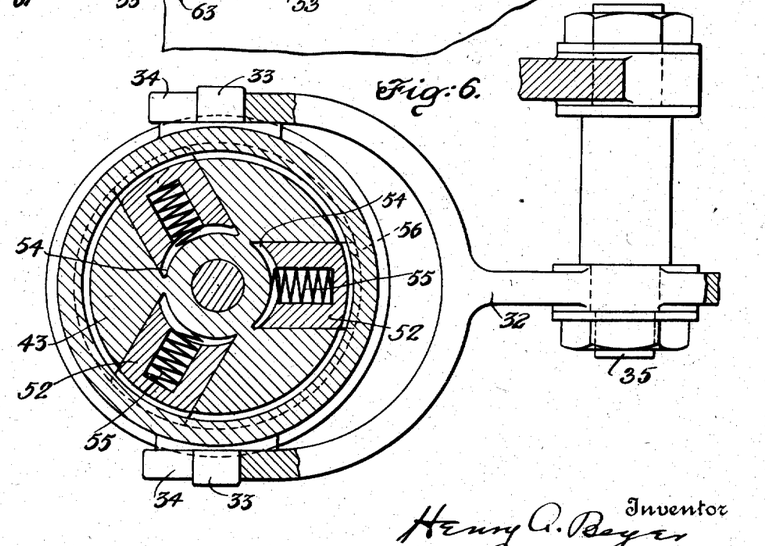
Fig. 6 represents a horizontal sectional view taken substantially upon the plane of line VI—VI of Fig. 5, looking in the direction of the arrows.
Figure 9:
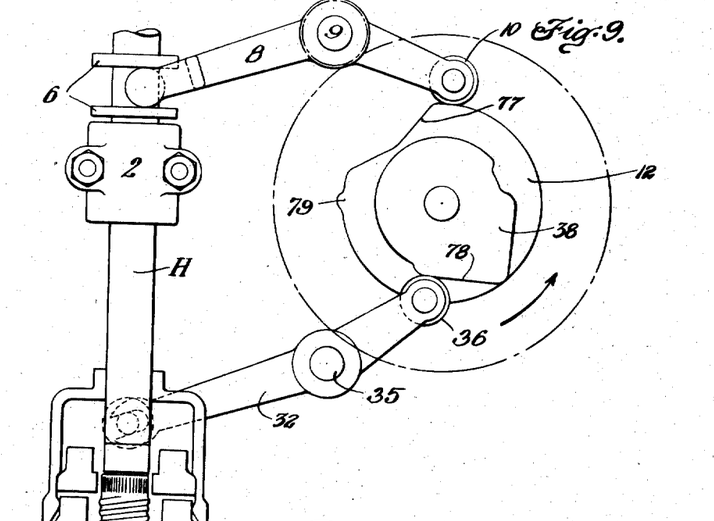
Figs. 9, 10, 11 and 12 represent diagrammatic views illustrating the successive steps in the operation of the parts of the gripping head and the controlling means therefor.
Figure 10:
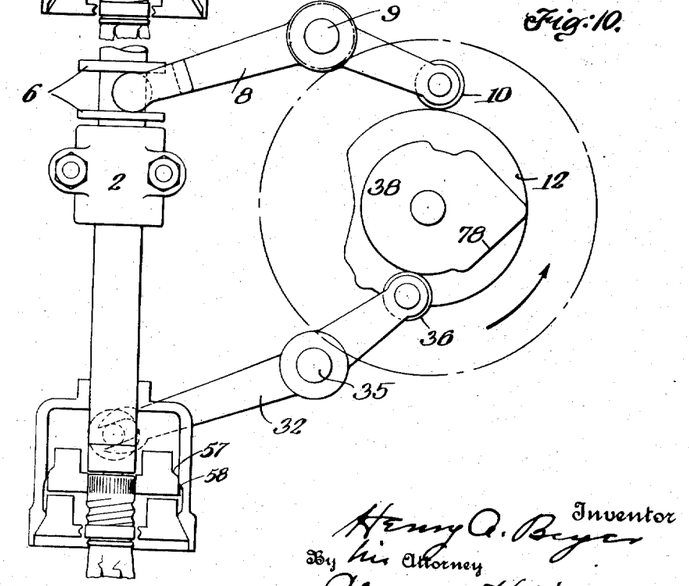
Figure 11:
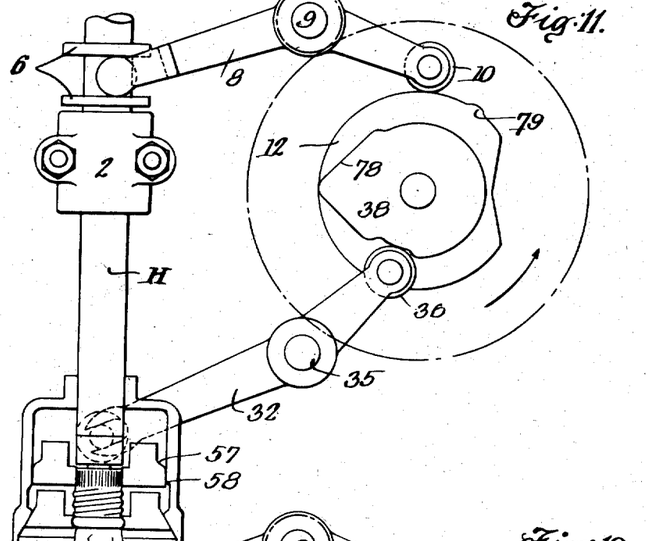

The operation of the device will now be understood: Assuming the parts to be in the position indicated in Figs. 1 and 5, the operator places the cap 75 loosely over the upper end of the bottle, indicated at 76, and places the bottle upon the table 65, as indicated in Fig. 1. He then presses upon the foot lever 27 to withdraw the latch 25. The cams 12 and 38 will immediately begin to rotate. The inclined surface 77 upon the cam 12 (see Fig. 9) will cause the bell crank 8 to swing and slide the shaft H downwardly toward the bottle. At the same time the inclined surface 78 upon the cam 38 will cause the bell crank 32 to swing and move the shell of the gripping head downwardly. The contour of the cams is such as to cause the shaft and the shell of the gripping head to initially move downwardly as one into the position shown in Fig. 9, in which position the two sets of jaws in the gripping head stand ready to be moved inwardly against those portions of the bottle cap upon which they are intended to operate. The contour of the cam 12 for approximately the following three-quarters revolution is such as to maintain the shaft H, and consequently the jaw carrying member 43, stationary. The contour of the cam 38 is such as to, during this period, move the shell of the gripping head first downwardly as shown in Fig. 10, and then further downwardly as in Fig. 11. In the first of these downward movements the coöperative cam surfaces 57 and 58 will operate to throw the jaws 52 inwardly to grip the cap. The continuing rotation of the shaft and jaws will then operate to screw the cap home. When the cap has become tight the friction connection between the jaw carrying member 43 and the shaft will slip and permit the jaws to cease rotating. The second of the downward movements referred to as shown in Fig. 11 takes place, therefore, after the cap has been screwed home, and serves to bring the coöperative cam faces 61 and 62 into operation for throwing in the second set of jaws 53, to crimp the part 64 of the cap about the beading 76 on the bottle. Thereafter the shell, with the gripping jaws, moves upwardly, first releasing the set of jaws 53 and then releasing the set of jaws 52.

Just prior to the release of one or both of the sets of jaws, means may be provided for pressing inwardly to a desired extent the upper end surface of the bottle cap, for causing the same to engage more tightly with the upper end of the bottle to improve the seal, if desired. Such a means is illustrated in the drawings as comprising a slight enlargement 79 upon the cam 12 (see Fig. 12) arranged to force the shaft H down slightly beyond its previous position. A die member 80 may be carried by the jaw carrying member 43 in a position to be pressed against the upper end of the bottle cap as the shaft makes this final downward movement.

Figure 12:
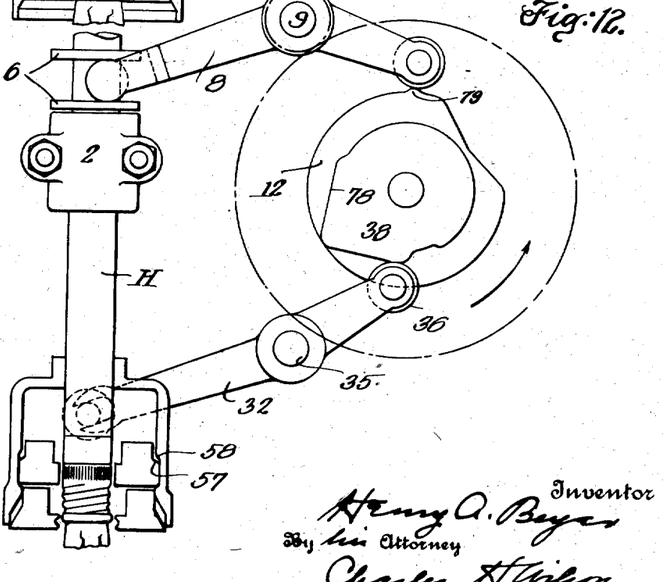

After the parts have reached the position indicated in Fig. 12, the contour of the cams is such as to cause the gripping head and shaft to move upwardly in unison to their original position in Fig. 1, when the bottle may be removed and a new one inserted.

If a new bottle is inserted before the gripping head again moves downwardly, it will be unnecessary for the operator to remove his foot from the lever, but where a little delay may be occasioned, he can allow the foot lever to rise and this will serve to permit the latch 25 to enter the notch 24, and thus retain the gripping head up until he is ready to insert the new bottle.

Figure 13:
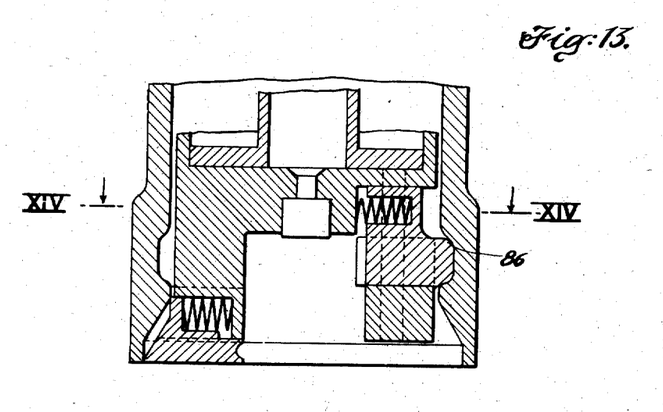
Fig. 13 represents a view similar to a portion of Fig. 5, but illustrating a modification of the structure shown in Fig. 5, said view being taken upon the plane of line XIII—XIII of Fig. 14, looking in the direction of the arrows.
Figure 14:
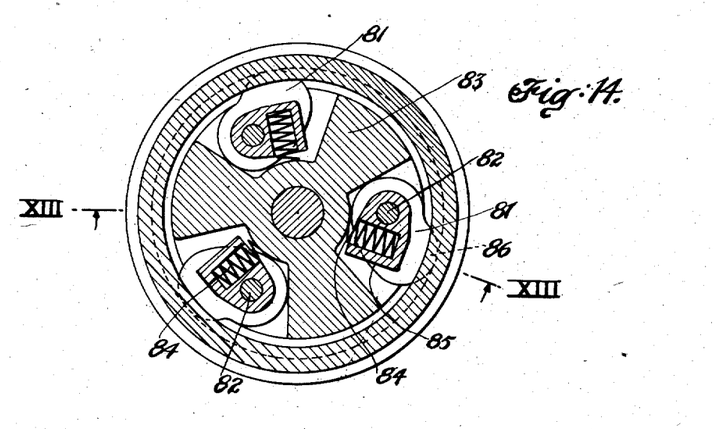
Fig. 14 represents a horizontal sectional view taken upon the plane of line XIV—XIV of Fig. 13, looking in the direction of the arrows.

The modification shown in Figs. 13 and 14 contemplates a slight change in the mounting of the jaws in the gripping head. In this modification the jaws, as 81, are pivotally mounted upon pivots 82 supported in the jaw carrying member 83. Springs 84 are arranged for rotating the jaws upon their pivots to swing their eccentric inner faces 85 away from central axis of the gripping head. The outer ends of the jaws, as 86, are arranged to be engaged by the inclined surface portion of the shell in the same manner as described for the structure in the other figures. The engagement in this instance, however, causes the jaws to rotate against the pressure of the springs to move the eccentric faces 85 toward the axis of the gripping head.

The two sets of jaws in this modification are intended to be constructed and operated upon the same principle, hence only the upper set is illustrated.

It will be understood that various changes may be resorted to in the form, construction and arrangement of the several parts without departing from the spirit and scope of my invention, and hence I do not intend to be limited to the details herein shown and described except as they may be specifically included in the claims.

Having thus described my invention what I claim as new and desire to secure by Letters Patent is:

1. Apparatus of the character described comprising a rotating shaft, a gripping head slidably mounted upon the shaft, jaws carried by said shaft, means for moving the shaft and head into operative position with respect to the bottle cap, and means for sliding the head upon the shaft for moving the jaws into gripping engagement with the cap.

2. Apparatus of the character described comprising a rotating shaft, a gripping head slidably mounted upon the shaft, a plurality of sets of jaws carried by the said shaft, means for moving the shaft and head into operative position with respect to the bottle cap, and means for sliding the head upon the shaft for moving both sets of jaws into gripping engagement with the cap.

3. Apparatus of the character described comprising a rotating shaft, a gripping head slidably mounted upon the shaft, a plurality of sets of jaws carried by said shaft, means for moving the shaft and head into operative position with respect to the bottle cap, and means for sliding the head upon the shaft for moving first one set of jaws and then another set of jaws into gripping engagement with the cap.

4. Apparatus of the character described comprising a rotating shaft, a gripping head slidably mounted upon the shaft, jaws carried by said shaft, means for moving the shaft and head into operative position with respect to the bottle cap, means for sliding the head upon the shaft for moving the jaws into gripping engagement with the cap, a die carried by the said shaft, and means for imparting sliding movement to the shaft after the sliding movement of the head has ended, for firmly pressing the die into engagement with the cap.

5. Apparatus of the character described comprising a rotating shaft, a gripping head slidably mounted upon the shaft, said gripping head having an interior cam surface, jaws carried by the shaft within the head, said jaws also having a cam surface, and means for moving the head with respect to the shaft to bring the cam surfaces on the head and jaws into coöperative engagement for moving the jaws into gripping position with respect to the bottle cap.

6. Apparatus of the character described comprising a rotating shaft, a gripping head slidably mounted upon the shaft, said gripping head having a plurality of interior cam surfaces, a plurality of sets of jaws carried by the shaft within the head, each of said sets of jaws also having a cam surface, and means for moving the head with respect to the shaft to bring the cam surfaces on the head and the sets of jaws into coöperative engagement for moving the sets of jaws into gripping position with respect to the bottle cap.

7. Apparatus of the character described comprising a rotating shaft, a gripping head slidably mounted upon the shaft, said gripping head having a plurality of interior cam surfaces, a plurality of sets of jaws carried by the shaft within the head, each of said sets of jaws also having a cam surface, and means for moving the head with respect to the shaft to bring the cam surfaces on the head and the sets of jaws into coöperative engagement for moving first one of the sets of jaws and then another of the sets of jaws into gripping position with respect to the bottle cap.

8. Apparatus of the character described comprising a rotating shaft, a gripping head slidably mounted upon the lower end of said shaft, a set of jaws comprised in said gripping head, cam controlled means for sliding said gripping head and shaft relatively to each other to cause the jaws of the gripping head to grip the bottle cap, and a second set of jaws comprised in said gripping head adapted to be operated by said cam controlled means for locking the cap to the bottle after the cap has been screwed home.

9. Apparatus of the character described comprising a rotating shaft, a jaw carrying member frictionally connected to rotate therewith, a set of jaws carried by said jaw carrying member, die carried by said jaw carrying member, means slidable upon the shaft for moving the jaws to gripping position and means for operating the die when the jaws are in gripping position.

10. Apparatus of the character described comprising a rotatably and slidably mounted shaft, means for rotating said shaft, a jaw carrying member carried by said shaft, a set of jaws carried by said jaw carrying member, a sleeve slidably mounted upon the shaft and encircling the jaw carrying member to control said jaws, a cam shaft, means for constantly rotating the cam shaft, cams carried by said cam shaft, means controlled by the cams of said cam shaft for sliding said first mentioned shaft and said sleeve, means frictionally connecting said cams to said cam shaft, and manually controlled means for retaining the cams against rotation at will notwithstanding rotation of the cam shaft.

11. Apparatus of the character described comprising a set of rotatably mounted jaws, a motor for rotating said jaws, shifting means for shifting said jaws bodily into a position ready to grip a bottle cap, means for operating the jaws to move the same to gripping position, control means for controlling said last mentioned means and said shifting means, connections between said motor and said control means for operating the control means by said motor, and manually operable means comprised in said connections for rendering the motor inoperative upon said control means at will.

In testimony whereof I affix my signature in the presence of two witnesses.

HENRY A. BEYER.

Witnesses:
EMMA WEINBERG,
LOUIS BRANDEVEIN.

Copies of this patent may be obtained for five cents each, by addressing the "Commissioner of Patents, Washington, D. C."